(12) United States Patent
Bhatnagar et al.

(10) Patent No.: US 6,846,758 B2
(45) Date of Patent: Jan. 25, 2005

US006846758B2

(54) BALLISTIC FABRIC LAMINATES

(75) Inventors: Ashok Bhatnagar, Richmond, VA (US); Chok Bin C. Tan, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 87 days.

(21) Appl. No.: 10/126,202

(22) Filed: Apr. 19, 2002

(65) Prior Publication Data

US 2003/0199215 A1 Oct. 23, 2003

(51) Int. Cl.[7] .......................... B32B 27/12; B32B 27/04
(52) U.S. Cl. ................. 442/135; 442/134; 442/239; 442/246; 442/255; 442/261; 442/286; 442/290; 428/911; 2/2.5
(58) Field of Search .................. 428/911; 442/134, 442/135, 181, 239, 246, 255, 261, 286, 290; 2/2.5

(56) References Cited

U.S. PATENT DOCUMENTS

| | | | |
|---|---|---|---|
| 4,403,012 A | 9/1983 | Harpell et al. | 428/290 |
| 4,457,985 A | 7/1984 | Harpell et al. | 428/224 |
| 4,501,856 A | 2/1985 | Harpell et al. | 525/240 |
| 4,543,286 A | 9/1985 | Harpell et al. | 428/288 |
| 4,563,392 A | 1/1986 | Harpell et al. | 428/394 |
| 4,584,347 A | 4/1986 | Harpell et al. | 525/119 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |
| 4,681,792 A | 7/1987 | Harpell et al. | 428/102 |
| 4,737,401 A | 4/1988 | Harpell et al. | 428/252 |
| 4,737,402 A | 4/1988 | Harpell et al. | 428/252 |
| 4,738,893 A | 4/1988 | Grillo | 428/252 |
| 4,748,064 A | 5/1988 | Harpell et al. | 428/113 |
| 4,820,568 A | 4/1989 | Harpell et al. | 428/113 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,165,989 A | 11/1992 | Bhatnagar et al. | 428/245 |
| 5,167,876 A | 12/1992 | Lem et al. | 252/602 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell et al. | 428/102 |
| 5,330,820 A | 7/1994 | Li et al. | 428/113 |
| 5,471,906 A | 12/1995 | Bachner Jr. et al. | 89/36.05 |
| 5,552,208 A | 9/1996 | Lin et al. | 428/113 |
| 5,587,230 A | 12/1996 | Lin et al. | 428/245 |
| 5,591,933 A * | 1/1997 | Li et al. | 89/36.02 |
| 5,677,029 A | 10/1997 | Prevorsek et al. | 428/113 |
| 5,788,907 A | 8/1998 | Brown Jr. et al. | 264/280 |
| 5,789,327 A | 8/1998 | Rousseau | 442/135 |
| 5,958,804 A | 9/1999 | Brown Jr. et al. | 442/192 |
| 6,219,842 B1 | 4/2001 | Bachner, Jr. | 2/2.5 |
| 6,248,676 B1 | 6/2001 | Dischler | 442/101 |
| 6,268,301 B1 | 7/2001 | Dalman et al. | 442/217 |
| 2001/0053645 A1 | 12/2001 | Henderson | 442/135 |

FOREIGN PATENT DOCUMENTS

| | | | |
|---|---|---|---|
| FR | 2443397 | 4/1980 | |
| GB | 2124887 | 2/1984 | |
| GB | 2276935 | 10/1994 | |
| WO | WO 91/12136 | 8/1991 | ........... B32B/31/20 |
| WO | WO 02/14408 | 2/2002 | |

OTHER PUBLICATIONS

"Lightweight Composite Hard Armor Non Apparel Systems with T–963 dtex DuPont Kevlar 29 Fibre", E.I. Dupont, 1984.

UltraX data sheet, Verseidag Industietextilien Gmbh, 1986.

* cited by examiner

*Primary Examiner*—Ula Ruddock
(74) *Attorney, Agent, or Firm*—Virginia Szigeti

(57) ABSTRACT

Woven fabric laminates having superior resistance to penetration by ballistic projectiles, assemblies thereof, and the method by which they are made. In one embodiment, among others, a laminate of the invention is comprised of a fabric woven from a high strength, high modulus yarn, a surface coating of a low modulus elastomer and a plastic film bonded to its elastomer-coated surface.

22 Claims, No Drawings

BALLISTIC FABRIC LAMINATES

CROSS-REFERENCES TO RELATED APPLICATIONS

This application is related to co-pending application Ser. No. 09/639,903 filed Aug. 16, 2000, entitled "Impact Resistant Rigid Composite and Method of Manufacture".

BACKGROUND OF THE INVENTION

1. Field of the Invention

This invention relates to woven fabric laminates having superior resistance to penetration by ballistic projectiles, assemblies thereof, and the method by which they are made.

2. Description of the Related Art

The construction of body armor for personal protection is an ancient but not archaic art. The origin and first use of armor likely dates to pre-historic ages Metal armor was already well known to the Egyptians by 1500 B.C.E. A wall painting in a tomb dating from the reign of Amenhotep II (1436–1411 B.C.E.) clearly shows a defensive garment formed of overlapping bronze scales. These were sewn to a cloth backing resembling a long shirt with short sleeves and an opening for the neck. ("A Historical Guide to Arms and Armor", Steven Bull, Edited by Tony North, Studio Editions Ltd., London, 1991)

The use of body armor persisted until about the end of the $17^{th}$ century. Armor had increased in weight in order to remain effective against musket fire. However, at the same time, new strategy and tactics called for greater infantry mobility. Armor fell into disuse and was not widely used again until World War II. When during World War II, casualties from shell fragments rose to 80%, and, with 70% of all wounds affecting the torso, it became highly desirable to produce a suitable body armor. Armor for bomber crews and ground troops was developed of steel, aluminum and resin-bonded fiber glass plates, as well as of heavy nylon cloth.

In more recent years, with the introduction of new strong fibers such as aramids and high molecular weight polyethylene, the weight of body armor was reduced to a level where it became practical for daily use by civilian police officers. In 1974, there were 132 federal, state and local officers killed in the line of duty; 128 of them were slain with firearms, and most of the murder weapons were handguns of 0.38 caliber or less. Lightweight body armor was introduced soon afterward. It has been credited with preventing the death of an estimated 2,500 law officers in the ensuing years (*Selection and Application Guide to Personal Body Armor* by the National Institute of Justice, November 2001).

Various constructions are known for fiber-reinforced composites used in impact and ballistic resistant articles such as helmets, panels, and vests. These composites display varying degrees of resistance to penetration by high speed impact from projectiles such as BB's, bullets, shells, shrapnel, glass fragments and the like. For example, U.S. Pat. Nos. 6,268, 301 B1, 6,248,676 B1, 6,219,842 B1; 5,677,029, 5,587,230; 5,552,208, 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401, 4,681,792; 4,650,710, 4,623,574; 4,613,535; 4,584,347; 4,563,392; 4,543,286; 4,501,856; 4,457,985; and 4,403,012; PCT Publication No. WO 91/12136; and a 1984 publication of E.I. DuPont De Nemours International S.A. entitled "Lightweight Composite Hard Armor Non Apparel Systems with T-963 3300 dtex DuPont Kevlar 29 Fibre", all describe ballistic resistant composites which include high strength fibers made from materials such as high molecular weight polyethylene, aramids and polybenzazoles. Such composites are said to be either flexible or rigid depending on the nature of their construction and the materials employed.

U.S. Pat. No. 4,737,401, Harpell et al., filed Dec. 9, 1985, and commonly assigned, discloses ballistic resistant fine weave fabric articles.

U.S. Pat. No. 4,623,574, Harpell et al., filed Jan. 14, 1985, and commonly assigned, discloses simple composites comprising high strength fibers embedded in an elastomeric matrix.

U.S. Pat. No. 5,677,029, Prevorsek et al., filed Dec. 12, 1996, and commonly assigned, discloses a flexible penetration resistant composite comprising at least one fibrous layer comprised of a network of strong fibers, and at least one continuous polymeric layer coextensive with, and at least partially bound to a surface of one of the fibrous layers.

U.S. Pat. No. 5,552,208, Lin et al, filed Oct. 29, 1993, and commonly assigned, discloses a ballistic resistant article comprised of a high strength fiber network in a matrix and a second matrix material in the form of a film which is adjacent to at least one side of the matrix-impregnated fiber network.

U.S. Pat. No. 5,471,906, Bachner, Jr. et al., discloses a body armor comprising an armor layer and a cover, surrounding and sealing the armor layer, comprising a sheet of waterproof and moisture vapor permeable fabric oriented to face the wearer.

U.S. Pat. Nos. 5,788,907 and 5,958,804, Brown, Jr. et al., disclose ballistically resistant calendered fabrics.

Aramid fabrics rubber coated on one or both sides are commercially produced by Verseidag Industrietextilien Gmbh. under the product name UltraX. Rigid panels formed by bonding the rubber-coated fabrics together under heat and pressure are also available.

Ballistically resistant composites are typically formed from layers of woven fabrics or sheets of fibers which are plied together. The fibers in a sheet may be unidirectionally oriented or felted in random orientation. Where the individual plies are unidirectionally oriented fibers, the successive plies are rotated relative to one another, for example at angles of 0°/90° or 0°/45°/90°/45°/0° or at other angles. In previous processes, with some exceptions, the individual plies of woven fabrics or fibers have generally been uncoated, or embedded in a polymeric matrix material which filled the void spaces between the fibers. If no matrix was present, the fabric or fiber sheet was inherently flexible. A contrasting type of construction is a composite consisting of fibers and a single major matrix material. To construct rigid composites of this type, individual plies were bonded together using heat and pressure to adhere the matrix in each ply, forming a bond between them, and consolidating the whole into a unitary article.

Each of the constructions cited above represented progress toward the goals to which they were directed. However, none described the specific constructions of the laminates and assemblies of this invention and none satisfied all of the needs met by this invention.

These earlier constructions had several disadvantages. Woven fabrics generally had poorer ballistic resistance than cross-plied unidirectional fiber composites. On the other hand, woven fabrics could be produced at lower cost and greater ease of manufacture with more commonly available equipment than cross-plied unidirectional fiber composites. The ballistic resistance of woven fabrics was improved by incorporation of a low modulus elastomeric matrix. However, the use of a matrix resin which completely filled the void spaces between the fibers added to the weight of the fabric and decreased its flexibility. A need exists for a woven fabric construction that retains the advantages of lower cost and greater ease of manufacture compared to cross-plied unidirectional composites, but which has ballistic resistance superior to conventional fabrics. Ideally, the woven fabric construction is of high flexibility but may be bonded to itself, or to hard facings, to form rigid panels.

SUMMARY OF THE INVENTION

This invention relates to novel fabric laminates having superior resistance to penetration by ballistic projectiles, assemblies thereof, and the method by which they are made. In one embodiment, among others, a ballistically resistant laminate of the invention comprises a woven fabric comprised of at least 50% by weight of high strength yarns having tenacities equal to or greater than about 7 grams per denier (g/d), initial tensile moduli equal to or greater than about 150 g/d, energies-to-break equal to or greater than about 8 J/g as measured by ASTM D2256; an elastomer coated on at least a portion of at least one surface of said woven fabric, said elastomer having an initial tensile modulus equal to or less than about 6,000 psi (41.3 MPa) as measured by ASTM D638; and plastic film bonded to at least a portion of said elastomer coated surface.

In another embodiment, a ballistically resistant laminate of the invention comprises a scoured and corona treated woven fabric comprised of at least a majority portion of high strength yarns having tenacities equal to or greater than about 7 g/d, initial tensile moduli of at least about 150 g/d, energies-to-break of at least about 8 J/g; a matrix resin having an initial tensile modulus, when cured, equal to or greater than about 300,000 (2.07 GPa); and plastic film bonded to at least a portion of at least one of said fabric surfaces.

Assemblies of the invention include, among others, rigid panels wherein at least one component is comprised of a plurality of the inventive laminates bonded together in stacked array.

The laminates and assemblies of the invention provide improved ballistic protection in hard and soft armor.

In one embodiment, the method of the invention comprises the steps of: forming a woven fabric comprised of at least a majority portion of yarns having a tenacity equal to or greater than about 7 g/d, initial tensile modulus of at least about 150 g/d, an energy-to-break of at least about 8 J/g; coating an elastomer on at least a portion of one surface of said fabric, said elastomer having an initial tensile modulus equal to or less than about 6,000 psi (41.3 Mpa); and bonding a plastic film to at least a portion of said elastomer-coated surface.

In another embodiment, the method of the invention comprises the steps of: forming a woven fabric comprised of at least a majority portion of yarns having a tenacity equal to or greater than about 7 g/d, initial tensile modulus of at least about 150 g/d, an energy-to-break of at least about 8 J/g; scouring and corona treating said fabric, impregnating said fabric with a resin having an initial tensile modulus, when cured, equal to or greater than 300,000 psi (2.07 GPa); and bonding a plastic film to at least a portion of one of said fabric surfaces.

DETAILED DESCRIPTION OF THE INVENTION

The invention comprises novel fabric laminates, assemblies thereof, and the method by which they are made. In one embodiment, among others, a ballistically resistant laminate of the invention comprises a woven fabric comprised of at least 50% by weight of high strength yarns having tenacities equal to or greater than about 7 g/d, initial tensile moduli of at least about 150 g/d, energies-to-break of at least about 8 J/g as measured by ASTM D2256; an elastomer coated on at least a portion of one surface of said woven fabric, said elastomer having a initial tensile modulus less than about 6,000 psi (41.3 MPa) as measured by ASTM D638; and plastic film bonded to at least a portion of said elastomer coated surface.

The invention also includes ballistically resistant rigid panels wherein at least one component is comprised of a plurality of the inventive laminates described immediately above bonded together in stacked array.

As used herein throughout, the terms initial tensile modulus, tensile modulus and modulus mean the modulus of elasticity as measured by ASTM 2256 for a yarn and by ASTM D638 for an elastomer or matrix material.

In another embodiment, a ballistically resistant laminate of the invention comprises a scoured and corona treated woven fabric comprised of at least 50% by weight of yarns having tenacities equal to or greater than about 7 g/d, initial tensile moduli of at least about 150 g/d, energies-to-break of at least about 8 J/g as measured by ASTM 2256; a matrix resin having an initial tensile modulus, when cured, equal to or greater than about 300,000 psi (2.07 Gpa) as measured by ASTM D638; and plastic film bonded to at least a portion of one of said fabric surfaces.

The invention also includes ballistically resistant rigid panels wherein at least one component is a plurality of the inventive laminates described immediately above bonded together in stacked array.

Notwithstanding the fact that the laminates of the invention possess superior resistance to penetration by ballistic projectiles, it is contemplated that additional protection may be needed against projectiles designed to be armor piercing. Therefore, in other embodiments of the invention, the ballistically resistant rigid panels disclosed above are bonded at one or both surfaces to a hard plate member consisting of one or more of a metal, a ceramic, a glass, a metal-filled composite, a ceramic-filled composite or a glass-filled composite.

For the purposes of the present invention, a fiber is an elongate body the length dimension of which is much greater that the transverse dimensions of width and thickness Accordingly, the term fiber includes filament, ribbon, strip, and the like having regular or irregular cross-section. A yarn is a continuous strand comprised of many fibers or filaments Complete analysis of penetration of fiber-reinforced composites is still beyond present capabilities, although several mechanisms have been identified. A small pointed projectile can penetrate armor by laterally displacing fibers without breaking them. In this case, the penetration resistance depends on how readily fibers may be pushed aside, and therefore, on the nature of the fiber network. Important factors are the tightness of weave or periodicity of crossovers in cross-plied unidirectional composites, yarn and fiber denier, fiber-to-fiber friction, matrix characteristics, interlaminar bond strengths and others. Sharp fragments can penetrate by shearing fibers.

Projectiles may also break fibers in tension. Impact of a projectile on a fabric causes propagation of a strain wave through the fabric. Ballistic resistance is greater if the strain wave can propagate rapidly and unimpeded through the fabric and involve greater volumes of fiber. Experimental and analytical work has shown that in all actual cases, all penetration modes exist and that their relative importance is greatly affected by the design of the composite.

The fabric portion of the inventive laminates may be of any weave pattern, including plain weave, twill, satin, three dimensional woven fabrics, and any of their several variations. Plain weave fabrics are preferred. More preferred are plain weave fabrics having an equal warp and weft count. The preferred warp and weft counts of the plain weave fabric are inversely related to the denier of the constituent yarn as shown in the approximate ranges of Table I.

TABLE I

| Yarn Denier Range | Preferred Range of Fabric Yarn Count | |
|---|---|---|
| | Ends/inch | Ends/cm |
| 50–150 | 60–100 | 24–39 |
| 150–1500 | 17–60 | 7–24 |
| 1,500–3,000 | 13–17 | 5–7 |

It will be understood that the foregoing is a general guideline and that it is not presently possible to specify a priori the best weave count for any particular combination of material, fiber denier and yarn denier. On the one hand, tighter weaves having the highest possible coverage make it more to difficult for the projectile to find holes and to push yarns and fibers aside. On the other hand, high frequency of yarn crossovers restricts propagation of the ballistic event through the fabric and lessens the volume of fibers able to absorb energy from the projectile. The skilled man will readily find the best yarn count for each fiber material, yarn denier and filament denier by experimentation.

For 1200 denier polyethylene yarns such as SPECTRA® 900 yarns produced by Honeywell International Inc., plain weave fabrics with about 17×17 ends/inch (6.7 ends/cm) to about 45×45 ends/inch (17.7 ends/cm) are preferred. More preferred are plain weave fabrics having from about 19×19 ends/inch (7.5 ends/cm) to about 23×23 ends/inch (9.0 ends/cm). For 650 denier SPECTRA® 900 polyethylene yarns, plain weave fabrics having from about 20×20 ends/inch (7.9 ends/cm) to about 40×40 ends/inch (16 ends/cm) are preferred. For 215 denier SPECTRA® 1000 polyethylene yarns, plain weave fabrics having from about 40×40 ends/inch (16 ends/cm) to about 60×60 ends/inch (24 ends/cm) are preferred.

It is preferred that the woven fabric constituent of the inventive laminate is scoured to remove all finishes. Preferably, the scouring process consists of agitation with a solution of non-ionic surfactant and trisodium phosphate at a temperature of about 50° C., followed by rinsing with clear water at about 50° C. and drying. For the purposes of this invention, a scoured fabric will be understood to have been treated in the above described manner.

It is preferred that the woven fabric be corona treated prior to application of surface coatings or matrix resins. Preferably the fabric is subjected to about 0.5 to about 3 kVA-min/m$^2$ of corona treatment. More preferably, the corona treatment level is about 1.7 kVA-min/m$^2$. Suitable corona treatment units are available from Enercon Industries Corp., Menomonee Falls, Wis. and from Sherman Treaters Ltd, Thame, Oxon., UK.

It is preferred that the woven fabric be calendered prior to corona treatment. Preferably, the calendering is conducted by passing the fabric through opposed rolls rotating at the same speed and applying a pressure of about 800 lbs/inch (140 kN/m) to about 1200 lbs/inch (210 kN/m) of fabric width at about 100° C. to about 130° C. Preferably the calendering pressure is about 900 lbs/inch (158 kN/m) to about 1000 lbs/inch (175 kN/m) of fabric width at about 115° C. to about 125° C.

The yarns comprising the fabric component of the inventive laminates may be from about 50 denier to about 3000 denier. The selection is governed by considerations of ballistic effectiveness and cost. Finer yarns are more costly to manufacture and to weave, but can produce greater ballistic effectiveness per unit weight. The yarns in the laminates of the invention are preferably of from about 200 denier to about 3000 denier. More preferably, the yarns are from about 650 denier to about 1500 denier. Most preferably, the yarns are from about 800 denier to about 1300 denier.

The fibers comprising the yarn are preferably from about 0.4 to about 20 denier. More preferably, the fibers are from about 0.8 to about 15 denier. Most preferably, the fibers are from about 1 to about 12 denier.

The cross-sections of fibers for use in this invention may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably the former.

High strength yarns for use in this invention are those having a tenacity equal to or greater than about 7 g/d, initial tensile modulus equal to or greater than about 150 g/d and an energy-to-break equal to or greater than about 8 J/g. For the purposes of this invention, the yarn tenacity, initial tensile modulus (modulus of elasticity) and energy-to break are measured by ASTM D2256. Preferred yarns are those having a tenacity equal to or greater than about 10 g/d, initial tensile modulus equal to or greater than about 200 g/d and an energy-to-break equal to or greater than about 20 J/g. Particularly preferred yarns are those having a tenacity equal to or greater than about 16 g/d, initial tensile modulus equal to or greater than about 400 g/d, and an energy-to-break equal to or greater than about 27 J/g. Most preferred yarns are those having a tenacity equal to or greater than about 22 g/d, Initial tensile modulus equal to or greater than about 900 g/d, and an energy-to-break equal to or greater than about 27 J/g. In the practice of this invention, yarns of choice have a tenacity equal to or greater than about 28 g/d, the initial tensile modulus is equal to or greater than about 1200 g/d and the energy-to-break is equal to or greater than about 40 J/g.

The yarns and fabrics of the invention may be comprised of one or more different high strength fibers. The yarns may be comprised of one or more different high strength fibers in essentially parallel alignment, or the yarns may be twisted, over-wrapped or entangled as disclosed in U.S. Pat. No. 5,773,370 to Dunbar et al., commonly assigned. The fabrics of the invention may be woven with yarns having different fibers in the warp and weft directions, or in other directions.

High strength fibers useful in the yarns and fabrics of the invention include highly oriented high molecular weight polyolefin fibers, particularly polyethylene fibers, aramid fibers, polybenzazole fibers such as polybenzoxazole (PBO) and polybenzothiazole (PBT), polyvinyl alcohol fibers, polyacrylonitrile, liquid crystal copolyester, glass, carbon fibers or basalt or other mineral fibers.

U.S. Pat. No. 4,457,985 generally discusses such high molecular weight polyethylene and polypropylene fibers, and the disclosure of this patent is hereby incoporated by reference to the extent that it is not inconsistent herewith. In the case of polyethylene, suitable fibers are those of weight average molecular weight of at least 150,000, preferably at least one million and more preferably between two million and five million Such high molecular weight polyethylene fibers may be grown in solution as described in U.S. Pat. No. 4,137,394 to Meihuzen et al., or U.S. Pat. No. 4,356,138 to Kavesh et al., issued Oct. 26, 1982, or a filament spun from a solution to form a gel structure, as described in German Off. No. 3,004,699 and GB No. 2051667, and especially as described in U.S. Pat. No. 4,413,110, or the polyethylene fibers may be produced by a rolling and drawing process as described in U.S. Pat. No. 5,702,657 and sold under the name TENSYLON® by ITS Industries Inc. As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-I-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultraviolet screening agents, colorants and the like which are commonly incorporated by reference.

Depending upon the formation technique, the draw ratio and temperatures, and other conditions, a variety of properties can be imparted to these fibers. The tenacity of the fibers should be at least 15 g/d, preferably at least 20 g/d, more preferably at least 25 g/d and most preferably at least 30 g/d. Similarly, the initial tensile modulus of the fibers, as measured by an Instron tensile testing machine, is at least 300 g/d, preferably at least 500 g/d and more preferably at least 1,000 g/d and most preferably at least 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of 150,000, one million and two million generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least 200,000, preferably at least one million and more preferably at least two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 g/d, with a preferred tenacity being at least 11 g/d. The initial tensile modulus for polypropylene is at least 160 g/d, preferably at least 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

High molecular weight polyvinyl alcohol (PV-OH) fibers having high tensile modulus are described in U.S. Pat. No. 4,440,711 to Kwon et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity of at least about 7 g/d, preferably at least about 10 g/d, more preferably at least about 14 g/d and most preferably at least about 17 g/d, and an energy to break of at least about 8 J/g. PV-OH fibers having a weight average molecular weight of at least about 200,000, a tenacity of at least about 10 g/d, a modulus of at least about 300 g/d, and an energy to break of about 8 J/g are more useful in producing a ballistic resistant article. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

In the case of aramid fibers, suitable fibers formed from aromatic polyamides are described in U.S. Pat. No. 3,671,542, which is hereby incorporated by reference. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 20 g/d, a modulus of at least about 900 g/d and an energy-to-break of at least about 30 J/g. For example, poly(p-phenylene terephyhalamide) filaments produced commercially by Dupont corporation under the trade name of KEVLAR® and having moderately high moduli and tenacity values are particularly useful in forming ballistic resistant composites. KEVLAR 29 has 500 g/d and 22 g/d and KEVLAR 49 has 1000 g/d and 22 g/d as values of initial tensile modulus and tenacity, respectively. Also useful in the practice of this invention is poly(m-phenylene isophthalamide) fibers produced commercially by Dupont under the trade name NOMEX®.

Suitable liquid crystal copolyester fibers for the practice of this invention are disclosed, for example, in U.S. Pat. Nos. 3,975,487; 4,118,372 and 4,161,470.

Suitable polybenzazole fibers for the practice of this invention are disclosed for example in U.S. Pat. Nos. 5,286,833, 5,296,185, 5,356,584, 5,534,205 and 6,040,050. Preferably, the polybenzazole fibers are ZYLON® brand fibers from Toyobo Co.

The elastomer useful in a laminate of the invention preferably possesses initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomer has initial tensile modulus equal to or less than about 1,200 psi (8.23 MPa).

A wide variety of elastomeric materials and formulations having appropriately low modulus may be utilized in this invention. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluroelastomers, silicone elastomers, thermoplastic elastomers, copolymers of ethylene.

Preferably, the elastomeric material does not bond too well or too loosely to the fabric material. Preferred for polyethylene fabrics are block copolymers of congugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x(x=3-150)$; wherein A is a block from a polyvinyl aromatic monomer and B is a block from a conjugated diene elastomer. Many of these polymers are produced commercially by Kraton Polymers, Inc.

The low modulus elastomer may be compounded with fillers such as carbon black, silica, etc and may be extended with oils and vulcanized by sulfur, peroxide, metal oxide or radiation cure systems using methods well known to rubber technologists. Blends of different elastomeric materials may be used together or one or more elastomers may be blended with one or more thermoplastics.

The elastomer coating preferably forms about 1 to about 10 percent by weight of an inventive laminate. More preferably, the elastomer coating forms about 2 to about 8 percent by weight of the laminate.

The elastomer coating may be applied by spraying or roll coating a solution of the elastomer onto the surface of the woven fabric followed by drying. Alternatively, the elastomer may be formed into a film or sheet and applied to the surface of the woven fabric by means of pressure and/or heat. It is preferred that block copolymer elastomers of the styrene-isoprene-styrene or the styrene-butadiene-styrene type are applied by roll coating of a solution followed by drying.

The matrix resin useful in a laminate of the invention preferably possesses initial tensile modulus (modulus of elasticity) equal to or greater than about 300,000 psi (2.07 GPa) as measured by ASTM D638. More preferably, the matrix resin has initial tensile modulus equal to or greater than about 400,000 psi (2.76 GPa).

Matrix resins useful in a laminate of the invention include thermoset allyls, aminos, cyanates, epoxies, phenolics, unsaturated polyesters, bismaleimides, rigid polyurethanes, silicones, vinyl esters and their copolymers and blends. It is important only that the matrix resin possesses the necessary initial tensile modulus. Thermoset vinyl ester resins are preferred. Preferably, the vinyl ester is one produced by the esterification of a polyfunctional epoxy resin with an unsaturated monocarboxylic acid, usually methacrylic or acrylic acid. Illustrative vinyl esters include diglycidyl adipate, diglycidyl isophthalate, di-(2,3-epoxybutyl) adipate, di-(2,3-epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di-(2,3-epoxyoctyl) tetrahydrophthalate, di-(4,5-epoxydodecyl) maleate, di-(2,3-epoxybutyl) terephthalate, di-(2,3-epoxypentyl) thiodiproprionate, di-(5,6-epoxytetradecyl) diphenyidicarboxylate, di-(3,4-epoxyheptyl) suphonyldibutyrate, tri-(2,3-epoxybutyl)-1,2,4-butanetricarboxylate, di-(5,6-epoxypentadecyl) maleate, di-(2,3-epoxybutyl) azelate, di-(3,4-epoxypentadecyl) citrate, di-(4,5-epoxyoctyl) cyclohexane-1,3-dicarboxylate, di-(4,5-epoxyoctadecyl) malonate, bisphenol-A-fumaric acid polyester and similar materials.

Most preferred are epoxy based vinyl ester resins, such as the DERAKANE® resins manufactured by Dow Chemical Company.

The matrix resin preferably forms from about 5 to about 25 percent by weight of the laminate. More preferably, the matrix resin forms from about 5 to about 15 percent by weight of the laminate.

The matrix resin is preferably applied by dipping or immersion of the woven fabric into either an uncured liquid matrix resin or a solution of the matrix resin to accomplish complete impregnation.

The plastic film useful in a laminate of the invention may be selected from the group consisting of polyolefins, polyamides, polyesters, polyurethanes, vinyl polymers, fluoropolymers and co-polymers and mixtures thereof. Preferably, the plastic film does not bond too well or too loosely to the elastomer coating or to the matrix resin. Where the elastomer coating is a block copolymer of a congugated diene and a vinyl aromatic copolymer, the plastic film is preferably linear low density polyethylene. Similarly, where the matrix resin is a vinyl ester resin, the plastic film is preferably linear low density polyethylene.

The plastic film is preferably from 0.0002 inches (5.1 micrometers) to about 0.005 inches (127 micrometers) in thickness. More preferably, the plastic film is from about 0.0003 inches (7.6 micrometers) to about 0.003 inches (76 micrometers) in thickness.

The plastic film preferably forms from about 0.5 to about 5 percent by weight of the laminate. Preferably the plastic film is biaxially oriented. Preferably the plastic film is bonded to the base materials of the laminate by means of heat and pressure.

In other embodiments, the invention comprises the methods of forming the inventive laminates. In one embodiment the method of the invention comprises the steps of: forming a woven fabric comprised of at least a majority portion of high strength yarns having a tenacity equal to or greater than about 7 g/d, initial tensile modulus of at least about 150 g/d, an energy-to-break of at least about 8 J/g; coating a elastomer on at least a portion of one surface of said fabric, said elastomer having a initial tensile modulus equal to or less than about 6,000 psi (41.3 MPa); and bonding a plastic film to at least a portion of said elastomer coated surface.

Preferably the fabric is scoured, calendered and corona treated. Preferably, the calendering is conducted by passing the fabric through opposed rolls rotating at the same speed and applying a pressure of about 800 lbs/inch (140 kN/m) to about 1200 lbs/inch (210 kN/m) of fabric width at about 100° C. to about 130° C.

In yet another embodiment, the method of the invention comprises the steps of: forming a woven fabric comprised of at least a majority portion of yarns having a tenacity equal to or greater than about 7 g/d, initial tensile modulus of at least about 150 g/d, an energy-to-break of at least about 8 J/g; said fabric; scouring and corona treating said fabric, impregnating said fabric with a resin having a initial tensile modulus, when cured, equal to or greater than 300,000 psi (2.07 GPa); and bonding a plastic film to at least a portion of one of said fabric surfaces.

Preferably the fabric is calendered after scouring and before corona treatment.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1 (Comparative)

A 1200 denier×120 filament polyethylene yarn, designated SPECTRA® 900 from Honeywell International Inc., having tensile properties of 30 g/d tenacity, 850 g/d modulus and 63 J/g energy-to-break, was woven into a 21×21 ends/inch (8.27 ends/cm) plain weave fabric. The woven fabric was scoured to remove finishes and corona treated at 1.7 kVA-min/m².

Example 2 (Comparative)

The same polyethylene woven fabric as described in Comparative Example 1 was scoured, calendered and corona treated at 1.7 kVA-min/m². The calendering was conducted by passing the fabric through opposed rolls rotating at the same speed and applying a pressure of 952 lbs/inch (163 kN/m) of fabric width at 121° C.

Example 3 (Comparative)

The same polyethylene woven fabric as described in Comparative Example 1 was scoured and corona treated at 1.7 kVA-min/m². A linear low density polyethylene film having a thickness of 0.00035 inches (8.89 micrometers) was laminated to one surface of the fabric by passing the fabric, the polyethylene film and an outer polyester release film through opposed rolls operating at the same speed under a roll pressure of 635 lbs/inch (109 kN/m) at 121° C. The release film was then stripped from the polyethylene-fabric laminate. The polyethylene film constituted 3.5 wt. % of the laminate.

Example 4 (Comparative)

The same polyethylene woven fabric as described in Comparative Example 1 was scoured, calendered as described in Comparative Example 2, and corona treated at 1.7 kVA-min/m². A cyclohexane solution consisting of 20% by weight of a styrene-isoprene-styrene block copolymer elastomer designated KRATON® D 1107 was applied to one surface of the fabric. After drying, the elastomer constituted 5 wt. % of the coated fabric. The initial tensile modulus of the neat KRATON® D1107 elastomer was 200 psi (1,38 kPa).

Example 5

The same polyethylene woven fabric as described in Comparative Example 1 was scoured and corona treated at 1.7 kVA-min/m². One surface of the fabric was coated with 5 wt % of KRATON® D1107 elastomer as described in Example 4. A linear low density polyethylene film having a thickness of 0.00035 inches (8.89 micrometers) was laminated to the elastomer coated surface of the fabric under a roll pressure of 635 lbs/inch of width (109 kN/m) at 121° C. A laminate of the invention was formed thereby.

Example 6

The same polyethylene woven fabric as described in Comparative Example 1 was scoured, calendered as described in Comparative Example 2, and corona treated at 1.7 kVA-min/m². A cyclohexane solution consisting of 20% by weight of a styrene-isoprene-styrene block copolymer elastomer designated KRATON® D1107 was applied to one surface of the fabric. A linear low density polyethylene film having a thickness of 0.00035 inches (8.89 micrometers) was laminated to the elastomer-coated surface of the fabric under a roll pressure of 635 lbs/inch of width (109 kN/m) at 121° C. A laminate of the invention was formed thereby.

Ballistic Testing

Ballistic targets were formed from each of the fabrics and laminates described in Comparative Examples 1 to 4 and Examples 5 and 6. Each ballistic target consisted of nineteen 18×18 inch (45.7×45.7 cm) squares cut from the material prepared in the example. The squares were stacked together to form a target without any connection joining the plies.

The ballistic resistance of the targets was evaluated according to the National Institute of Justice Standard NIJ 0101.03 using a clay backing and a 9 mm full metal jacketed, 124 grain (8.0 g) projectile. The areal densities of the targets, the velocities at which 50% of projectiles failed to penetrate the targets (V50) and the specific energy absorption of the targets (SEAT) are listed in Table II below.

It is seen upon inspection of Comparative Example 2 vs. Comparative Example 1 that calendering of the fabric substantially increased its ballistic effectiveness (SEAT: 72 vs. 34).

Inspection of Comparative Example 3 vs. Comparative Example 2 shows that laminating a polyethylene film to the fabric instead of calendering similarly increased ballistic effectiveness to almost the same degree (SEAT: 68 vs. 72).

Inspection of Comparative Example 4 vs. Comparative Example 2 shows that 5 wt. % of a coating of a low modulus elastomer on one surface of a calendered fabric further increased ballistic effectiveness (SEAT: 100 vs. 72).

Surprisingly, Example 5, a laminate of the invention, comprising an uncalendered woven fabric, and a combination of a low modulus elastomer coating on the fabric surface and a plastic film bonded to the elastomer coated surface showed superior ballistic resistance to any of the foregoing fabrics or laminates (SEAT: 112). Surprisingly also, Example 6, a laminate of the invention, comprising the same low modulus elastomer coating and plastic film on a calendered fabric, although best of all, showed little further gain in ballistic resistance (SEAT: 117).

Without being held to a particular theory, it is believed that the role of the low modulus elastomer in a laminate of the invention is to increase the friction between yarns and between filaments in a yarn and thus make it more difficult for the projectile to push filaments and yarns aside. It is believed that the role of the plastic film is to help spread the strain wave caused by the ballistic impact and involve a greater volume of fiber in the ballistic event. In consequence, both the elastomer and the plastic film work together to require the projectile to break more of the high strength yarns and dissipate more energy.

TABLE II

BALLISTIC PERFORMANCE OF TARGETS
Fabric Component: 1200 denier SPECTRA ® 900; 21 × 21 ends/inch

| Ex No | Fabric Treatment | Elastomer, wt. % | PE Film. Wt. % | Target Areal Density, kg/m² | V50 ft/sec | V50 m/sec | SEAT, J-m²/kg |
|---|---|---|---|---|---|---|---|
| 1 Comp | SC, CT | 0 | 0 | 4.26 | 618 | 188.4 | 34 |
| 2 Comp | SC, CAL, CT | 0 | 0 | 4.26 | 903 | 275.2 | 72 |

TABLE II-continued

BALLISTIC PERFORMANCE OF TARGETS
Fabric Component: 1200 denier SPECTRA ® 900; 21 × 21 ends/inch

| Ex No | Fabric Treatment | Elastomer, wt. % | PE Film. Wt. % | Target Areal Density, kg/m² | V50 ft/sec | V50 m/sec | SEAT, J-m²/kg |
|---|---|---|---|---|---|---|---|
| 3 Comp | SC, CT | 0 | 3.5 | 4.41 | 894 | 272.5 | 68 |
| 4 Comp | SC, CAL, CT | 5 | 0 | 4.56 | 1105 | 336.8 | 100 |
| 5 | SC, CT | 5 | 3.5 | 4.93 | 1215 | 370.3 | 112 |
| 6 | SC, CAL, CT | 5 | 3.5 | 4.95 | 1246 | 379.8 | 117 |

SC: Scoured
CAL: Calendered
CT: Corona treate

Example 7 (Comparative)

A 215 denier×60 filament polyethylene yarn, designated SPECTRA® 1000 from Honeywell International Inc., having tensile properties of 35 g/d tenacity, 1320 g/d modulus and 65 J/g energy-to-break, was woven into a 56×56 ends/inch (22 ends/cm) plain weave fabric. The woven fabric was scoured to remove finishes and corona treated at 1.7 kVA-min/m².

A ballistic target was formed from twenty-one 18×18 inch (45.7×45.7 cm) squares cut from the fabric and stacked together without any connection joining the plies.

Example 8

The same polyethylene woven fabric as described in Comparative Example 7 was scoured, calendered as described in Comparative Example 2, and corona treated at 1.7 kVA-min/m². A cyclohexane solution consisting of 20% by weight of a styrene-isoprene-styrene block copolymer elastomer designated KRATON® D 1107 was applied to one surface of the fabric. After drying, the elastomer constituted 5 wt. % of the coated fabric. A linear low density polyethylene film having a thickness of 0.00035 inches (8.89 micrometers) was laminated to the elastomer-coated surface of the fabric under a roll pressure of 635 lbs/inch of width (109 kN/m) at 121° C. A laminate of the invention was formed thereby.

A ballistic target was formed from thirty-nine 18×18 inch (45.7×45.7 cm) squares cut from the laminate and stacked together without any connection joining the plies.

Example 9

The same polyethylene woven fabric as described in Comparative Example 7 was scoured, calendered as described in Comparative Example 2, and corona treated at 1.7 kVA-min/m². A cyclohexane solution consisting of 20% by weight of a styrene-isoprene-styrene block copolymer elastomer designated KRATON® D 1107 was applied to one surface of the fabric. After drying, the elastomer constituted 10 wt. % of the coated fabric. A linear low density polyethylene film having a thickness of 0.00035 inches (8.89 micrometers) was laminated to the elastomer coated surface of the as described in Example 8. A laminate of the invention was formed thereby.

A ballistic target was formed from thirty-seven 18×18 inch (45.7×45.7 cm) squares cut from the laminate and stacked together without any connection joining the plies.

Ballistic Testing

The ballistic resistance of the targets prepared in Comparative Example 7 and Examples 8 and 9 was evaluated according to the National Institute of Justice Standard NIJ 0101.03 using a clay backing and two projectiles: a 9 mm full metal jacketed, 124 grain (8.0 g) projectile and 357 magnum 158 grain (10.2 g) projectile. The areal densities of the targets, the velocities at which 50% of projectiles penetrated the targets (V50) and the specific energy absorption of the targets (SEAT) are listed in Table III below.

It will be seen that the two laminates of the invention (Examples 8 and 9) prevented penetration by 50% of projectiles at V50 velocities more than two and half fold greater than the unmodified fabric of Comparative Example 7 even at somewhat lower areal densities. The specific energy absorption by the laminate containing the lower elastomer coating weight (5 wt. % for Example 8) was slightly better than for the laminate containing the higher elastomer coating weight (10% for Example 9).

TABLE III

BALLISTIC PERFORMANCE OF TARGETS
Fabric Component: 215 denier SPECTRA ® 1000; 56 × 56 ends/inch

| Ex No | Fabric Treatment | Elastomer, wt. % | PE Film, wt. % | Target Areal Density, kg/m² | 9 mm FMJ V50, ft/sec (m/sec) | 9 mm FMJ SEAT, J-m²/kg | 357 MAG V50, ft/sec (m/sec) | 357 MAG SEAT, J-m²/kg |
|---|---|---|---|---|---|---|---|---|
| 7 (Comp) | SC,CT | 0 | 0 | 5.35 | <600 (<196) | n.a. | <600 (<196) | n.a |

TABLE III-continued

BALLISTIC PERFORMANCE OF TARGETS
Fabric Component: 215 denier SPECTRA ® 1000; 56 × 56 ends/inch

| Ex No | Fabric Treatment | Elastomer, wt. % | PE Film, wt. % | Target Areal Density, kg/m² | 9 mm FMJ V50, ft/sec (m/sec) | 9 mm FMJ SEAT, J-m²/kg | 357 MAG V50, ft/sec (m/sec) | 357 MAG SEAT, J-m²/kg |
|---|---|---|---|---|---|---|---|---|
| 8 | SC,CAL,CT | 5 | 1.70 | 4.97 | 1617 (530) | 198 | 1656 (543) | 262 |
| 9 | SC,CAL,CT | 10 | 1.71 | 4.93 | 1588 (521) | 190 | 1566 (514) | 236 |

SC: Scoured
CAL: Calendered
CT: Corona Treated
n.a.: not available

Example 10 (Comparative)

A 1200 denier×120 filament polyethylene yarn designated SPECTRA®) 900 from Honeywell International, having tensile properties of 30 g/d tenacity, 850 g/d modulus and 63 J/g energy-to-break, was woven into a 21×21 ends/inch (8.27 ends/cm) plain weave fabric. The woven fabric was scoured to remove finishes and corona treated at 1.7 kVA-min/m². The fabric was impregnated with 20% by weight of an epoxy vinyl ester resin (Dow Chemical Co. Derekane 411 modified by removal of styrene monomer) containing 1.5% 2,5 dimethyl-2,5di(2-ethylhexanoyl peroxy) hexane curing agent. Impregnated fabric layers were stacked and bonded together by heating and curing the resin at 120° C. under a pressure of 500 psi (3.45 MPa). The initial tensile modulus of the neat resin in the cured state is 460,000 psi (3.17 GPa). A rigid panel ballistic target was formed having an areal density of 4.89 kg/m².

Example 11

The same woven fabric as described in Comparative Example 10 was scoured, calendered as described in Comparative Example 2, and corona treated at 1.7 kVA-min/m².

The fabric was impregnated with 10% by weight of a modified epoxy vinyl ester resin (Dow Chemical Co. Derekane 411 modified by removal of styrene monomer) containing 1.5% of 2,5 dimethyl-2,5di(2-ethylhexanoyl peroxy) hexane curing agent. The initial tensile modulus of the neat resin in the cured state is 460,000 psi (3.17 GPa). A linear low density polyethylene film having a thickness of 0.0035 inches (88.9 micrometers) was laminated to the elastomer coated surface of the fabric under a roll pressure of 635 lbs/inch of width (109 kN/m) thereby forming a laminate of the invention.

Laminate layers were stacked and bonded together by heating and curing the resin under a pressure of 500 psi (3.44 MPa) at 120° C. A rigid panel ballistic target of the invention was thereby formed having an areal density of 4.89 kg/m².

Ballistic Testing

The ballistic resistances of the rigid panels prepared in Comparative Example 10 and Example 11 were evaluated in accordance with the procedure of MIL-STD-662F (Revised 18 Dec. 1997), using caliber 0.22, Type 2, 17.0 grain (1.166 g) fragment simulator projectiles (FSP) conforming to MIL-P-46593A. The test samples were mounted on an indoor range 12.5 feet from the muzzle of a test barrel to produce zero degree obliquity impacts. Lumiline screens were positioned at 5 and 10 feet, which in conjunction with an elapsed time counter (chronograph), were used to compute projectile velocities 7.5 feet from the muzzle. Penetrations were determined by visual examination of a 0.020 inch (0.0508 cm) thick sheet of 2024-T3 aluminum positioned 2 inches behind and parallel to the test samples.

The V50 for each test sample was calculated based on an equal number of highest partial penetration velocities and lowest complete penetration velocities of caliber 0.22, Type 2, 17.0 grain FSP within a 125 feet per second velocity spread. The normal up-and-down firing procedure was used. A minimum of four partial penetrations and four complete penetrations were achieved with velocities within a 125 feet per second velocity spread. The V50 was calculated by taking the arithmetic mean of an equal number of highest partial and lowest complete penetration impact velocities within the velocity span of 125 feet per second.

The areal densities of the targets, the V50 and the specific energy absorption of the targets (SEAT) are listed in Table IV below. It will be seen that the rigid panel of the invention had superior ballistic resistance compared to the control panel.

Example 12 (Comparative)

An 1140 denier yarn designated KEVLAR® 49 aramid (poly(phenylene terphthalamide)) from DuPont, having tensile properties of 28 g/d tenacity, 976 g/d modulus and 24 J/g energy-to-break, was woven into a 17×17 ends/inch (6.7 ends/cm) plain weave fabric. The fabric is impregnated with 10% by weight of an epoxy vinyl ester resin (Dow Chemical Co. Derekane 411 modified by removal of styrene monomer) containing 1.5% of 2,5 dimethyl-2,5di(2-ethylhexanoyl peroxy) hexane curing agent. Impregnated fabric layers are stacked and bonded together by heating and curing the resin at 120° C. under a pressure of 500 psi (3.45 MPa). The initial tensile modulus of the neat resin in the cured state is 460,000 psi (3.17 GPa). A rigid panel ballistic target is formed having an areal density of 4.89 kg/m².

TABLE IV

BALLISTIC PERFORMANCE OF TARGETS
Fabric Component: 1200 denier SPECTRA ® 900; 21 × 21 ends/inch

| Ex No | Fabric Treatment | Resin Matrix, wt. % | PE film, wt. % | Target Areal Density, kg/m² | V50 ft/sec | V50 m/sec | SEAT, J-m²kg |
|---|---|---|---|---|---|---|---|
| 10 (Comp) | SC, CT | 20 | 0 | 4.89 | 1550 | 472 | 24.3 |
| 11 | SC, CAL, CT | 10 | 1.67 | 4.89 | 1656 | 505 | 28.5 |

SC: Scoured
CAL: Calendered
CT: Corona Treated

Example 13

The same KEVLAR® 49 fabric as described in Comparative Example 12 is scoured and calendered as described in Comparative Example 2. The fabric is impregnated with 10% by weight of a modified epoxy vinyl ester resin (Dow Chemical Co. Derekane 411 modified by removal of styrene monomer) containing 1.5% of 2,5 dimethyl-2,5di(2-ethylhexanoyl peroxy) hexane curing agent. The initial tensile modulus of the neat resin in the cured state is 460,000 psi (3.17 GPa). A linear low density polyethylene film having a thickness of 0.0035 inches (88.9 micrometers) is laminated to the elastomer coated surface of the fabric under a roll pressure of 635 lbs/inch of width (109 kN/m) thereby forming a laminate of the invention.

Laminate layers are stacked and bonded together by heating and curing the resin under a pressure of 500 psi (3.44 MPa) at 120° C. A rigid panel ballistic target of the invention is thereby formed having an areal density of 4.89 kg/m².

Example 14 (Comparative)

An 1090 dtex yarn designated ZYLON® PBO fiber (poly(p-phenylene-2,6,-benzobisoxazole), grade HM from Toyobo Co., having nominal tensile properties of 42 g/d tenacity, 1900 g/d modulus and 26 J/g energy-to-break, is woven into a 17×17 ends/inch (6.7 ends/cm) plain weave fabric. The fabric is impregnated with 20% by weight of an epoxy vinyl ester resin (Dow Chemical Co. Derekane 411 modified by removal of styrene monomer) containing 1.5% of 2,5 dimethyl-2,5di(2-ethylhexanoyl peroxy) hexane curing agent. Impregnated fabric layers are stacked and bonded together by heating and curing the resin at 120° C. under a pressure of 500 psi (3.45 MPa). The initial tensile modulus of the neat resin in the cured state is 460,000 psi (3.17 GPa). A rigid panel ballistic target is formed having an areal density of 4.89 kg/m².

Example 15

The same ZYLON® PBO fabric as described in Comparative Example 14 is scoured, as described in Comparative Example 2. The fabric is impregnated with 10% by weight of a modified epoxy vinyl ester resin (Dow Chemical Co. Derekane 411 modified by removal of styrene monomer) containing 1.5% of 2,5 dimethyl-2,5di(2-ethylhexanoyl peroxy) hexane curing agent. The initial tensile modulus of the neat resin in the cured state is 460,000 psi (3.17 GPa). A linear low density polyethylene film having a thickness of 0.0035 inches (88.9 micrometers) is laminated to the elastomer coated surface of the fabric under a roll pressure of 635 lbs/inch of width (109 kN/m) thereby forming a laminate of the invention.

Laminate layers are stacked and bonded together by heating and curing the resin under a pressure of 500 psi (3.44 MPa) at 120° C. A rigid panel ballistic target of the invention is thereby formed having an areal density of 4.89 kg/m².

Ballistic Testing

The ballistic resistances of the rigid panels prepared in Comparative Examples 12 and 14 and Examples of the Invention 13 and 15 are evaluated in accordance with the procedure of MIL-STD-662F (Revised 18 Dec. 1997), using caliber 0.22, Type 2, 17.0 grain (1.166 g) fragment simulator projectiles (FSP) conforming to MIL-P-46593A. The test samples are mounted on an indoor range 12.5 feet from the muzzle of a test barrel to produce zero degree obliquity impacts. Lumiline screens are positioned at 5 and 10 feet, which in conjunction with an elapsed time counter (chronograph), were used to compute projectile velocities 7.5 feet from the muzzle. Penetrations are determined by visual examination of a 0.020 inch (0.0508 cm) thick sheet of 2024-T3 aluminum positioned 2 inches behind and parallel to the test samples. It is expected that the rigid panels of the invention will have superior ballistic resistance compared with their respective control panels.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A ballistically resistant laminate comprising:
   a. a matrix-free woven fabric comprised of at least 50% by weight of high strength yarns having tenacities equal to or greater than about 7 g/d, initial tensile moduli equal to or greater than about 150 g/d and energies-to-break equal to or greater than about 8 J/g as measured by ASTM D2256;
   b. an elastomer coated on at least a portion of one surface of said woven fabric, said elastomer having an initial tensile modulus equal to or less than about 6000 psi (41.4 MPa) as measured by ASTM D638; and
   c. a plastic film bonded to at least a portion of said elastomer coated surface.

2. The laminate of claim 1 wherein said woven fabric is a scoured and corona treated woven fabric.

3. The laminate of claim 1 wherein said woven fabric is a scoured, corona treated and calendered woven fabric.

4. The laminate of claim 1 wherein said high strength yarns have tenacities equal to or greater than about 15 g/d, initial tensile moduli equal to or greater than about 400 g/d and energies-to-break equal to or greater than about 15 J/g as measured by ASTM D2256.

5. The laminate of claim 1 wherein said high strength yarns have tenacities equal to or greater than about 30 g/d, initial tensile moduli equal to or greater than about 1000 g/d and energies-to-break equal to or greater than about 27 J/g as measured by ASTM D2256.

6. The laminate of claim 1 wherein at least one of said high strength yarns is a polyethylene yarn.

7. The laminate of claim 1 wherein at least one of said high strength yarns is a poly(p-phenylene terephthalmide) yarn.

8. The laminate of claim 1 wherein at least one of said high strength yarns is a polybenzazole yarn selected from the group consisting of a polybenzoxazole (PBO) yarn and a polybenzothiazole (PBT) yarn.

9. The laminate of claim 1 wherein said elastomer has an initial tensile modulus equal to or less than about 2400 psi (16.5 MPa) as measured by ASTM D638.

10. The laminate of claim 1 wherein said elastomer has an initial tensile modulus equal to or less than about 1200 psi (8.23 MPa) as measured by ASTM D638.

11. The laminate of claim 1 where said elastomer comprises about 0.5 to about 15 percent by weight of the laminate.

12. The laminate of claim 1 where said elastomer comprises about 1 to about 10 percent by weight of the laminate.

13. The laminate of claim 1 where said elastomer comprises about 2 to about 8 percent by weight of the laminate.

14. The laminate of claim 1 wherein said plastic film comprises about 0.5 to about 5 percent by weight of the laminate.

15. The laminate of claim 1 wherein said plastic film is comprised of a member selected from the group consisting of polyolefin, polyamide, polyester and polyfluorocarbon.

16. The laminate of claim 1 wherein said plastic film is comprised of polyethylene.

17. A ballistically resistant rigid panel wherein at least one component is comprised of a plurality of the laminates of claim 1 bonded together in stacked array.

18. The ballistically resistant rigid panel of claim 17 further comprised of at least one hard face member selected from the group consisting of a metal, a ceramic, a glass, a metal filled composite, a ceramic filled composite or a glass filled composite.

19. A ballistically resistant article comprising a plurality of the laminates of claim 1 stacked face-to-face in unconnected or loosely connected array.

20. A ballistically resistant laminate comprising:
a) a scoured and corona treated, matrix-free woven fabric comprised of at least 50% by weight of high strength yarns having tenacities equal to or greater than about 22 g/d, initial tensile moduli equal to or greater than about 400 g/d and energies-to-break equal to or greater than about 22 J/g as measured by ASTM D2256;
b) an elastomer having a initial tensile modulus less than about 1200 psi (8.23 MPa) as measured by ASTM D638 coated on at least a portion of one surface of said woven fabric, said elastomer comprising about 1 to 10 percent of the weight of the laminate; and
c) a plastic film bonded to said elastomer coated surface, said plastic film comprising about 0.5 to about 5 percent of the weight of the laminate.

21. A ballistically resistant laminate comprising:
a) a scoured and corona treated, matrix-free woven fabric comprised of at least 50% by weight of high strength polyethylene yarn having a tenacity equal to or greater than about 22 g/d, initial tensile modulus equal to or greater than about 400 g/d and energy-to-break equal to or greater than about 22 J/g as measured by ASTM D2256;
b) an elastomer comprising a block copolymer of a conjugated diene and a vinyl aromatic copolymer having an initial tensile modulus less than about 1200 psi (8.23 MPa) as measured by ASTM D638 coated on at least a portion of one surface of said woven fabric, said elastomer comprising about 1 to 10 percent of the weight of the laminate; and
c) a polyethylene film bonded to said elastomer coated surface, said polyethylene film comprising about 0.5 to about 5 percent of the weight of the laminate.

22. The laminate of claim 20 or claim 21 wherein said woven fabric is a scoured, corona treated and calendered woven fabric.

* * * * *